(12) United States Patent
Ricketts

(10) Patent No.: US 8,961,285 B2
(45) Date of Patent: Feb. 24, 2015

(54) RESIDUE SEPARATING FEED SYSTEM FOR BIOMASS INCLUDING AN IMPELLER

(75) Inventor: Jonathan E. Ricketts, Ephrata, PA (US)

(73) Assignee: CNH Industrial America LLC, New Holland, PA (US)

( * ) Notice: Subject to any disclaimer, the term of this patent is extended or adjusted under 35 U.S.C. 154(b) by 0 days.

(21) Appl. No.: 13/498,463

(22) PCT Filed: Sep. 28, 2010

(86) PCT No.: PCT/US2010/050465
§ 371 (c)(1),
(2), (4) Date: Apr. 25, 2012

(87) PCT Pub. No.: WO2011/041278
PCT Pub. Date: Apr. 7, 2011

(65) Prior Publication Data
US 2012/0208609 A1    Aug. 16, 2012

Related U.S. Application Data

(60) Provisional application No. 61/277,758, filed on Sep. 29, 2009.

(51) Int. Cl.
*A01D 17/02* (2006.01)
*A01F 12/46* (2006.01)
*A01D 90/02* (2006.01)
*A01F 11/06* (2006.01)
*A01D 45/02* (2006.01)

(52) U.S. Cl.
CPC ............. *A01D 90/02* (2013.01); *A01F 11/06* (2013.01); *A01D 45/02* (2013.01)
USPC ........................................ 460/114

(58) Field of Classification Search
USPC ............... 460/114, 42, 44, 80, 84, 99, 97; 209/138, 639, 923, 139.1, 154, 644, 209/922
See application file for complete search history.

(56) References Cited

U.S. PATENT DOCUMENTS

| 497,693 A | 5/1893 | Taylor |
| 1,436,428 A | 11/1922 | Kutscha |
| 1,600,212 A | 9/1926 | Berger |

(Continued)

FOREIGN PATENT DOCUMENTS

| EP | 1606990 | 12/2005 |
| GB | 2035822 | 6/1980 |

(Continued)

*Primary Examiner* — Árpád Fábián-Kovács
(74) *Attorney, Agent, or Firm* — Seyed V. Sharifi T.; Patrick M. Sheldrake

(57) ABSTRACT

A feed system for a biomass collection device uses a conveyor for dropping a flow comprising a mixture of denser or heavier biomass to be collected such as cobs, and less dense or lighter biomass residue such as leaf trash, through a space, and rotary feed apparatus below for receiving the flow, operable for propelling the received flow into a collection device, in combination with a fan configured and operable for directing a flow of air along a second path intersecting the first path in a manner to divert at least a substantial portion of the less dense or lighter biomass residue away from the feed apparatus, while allowing substantially all of the denser or heavier biomass to continue along the first path to the feed apparatus for feeding into the collection device. Distribution apparatus along the second path can then be used to spread the diverted biomass.

18 Claims, 5 Drawing Sheets

(56) References Cited

U.S. PATENT DOCUMENTS

| | | | |
|---|---|---|---|
| 1,849,756 A | 3/1932 | Grossman | |
| 2,080,717 A | 5/1937 | Hitchcock | |
| 2,761,578 A | 9/1956 | Brownlee et al. | |
| 2,797,001 A | 6/1957 | Smith | |
| 2,885,209 A | 5/1959 | Bruecker | |
| 2,935,193 A * | 5/1960 | Karlsson | 209/136 |
| 3,014,729 A | 12/1961 | Henningsen et al. | |
| 3,071,246 A * | 1/1963 | Schimke Edwin J | 209/27 |
| 3,241,657 A | 3/1966 | Buschbom | |
| 3,298,162 A * | 1/1967 | Medd | 56/13.9 |
| 3,324,859 A | 6/1967 | Bossard | |
| 3,630,009 A * | 12/1971 | Ashton | 56/11.9 |
| 3,680,291 A | 8/1972 | Soteropulos | 56/14.3 |
| 3,721,075 A * | 3/1973 | Weiberg | 56/13.5 |
| 3,721,333 A | 3/1973 | Boone | |
| 3,727,617 A | 4/1973 | Hadley et al. | |
| 3,772,860 A * | 11/1973 | Weiberg | 56/13.5 |
| 3,833,006 A * | 9/1974 | Temple | 460/99 |
| 3,863,431 A | 2/1975 | Fowler | |
| 3,874,609 A | 4/1975 | Larson | |
| 3,952,889 A * | 4/1976 | Wanker et al. | 406/39 |
| 3,962,072 A * | 6/1976 | Ramacher et al. | 209/140 |
| 4,121,778 A * | 10/1978 | Quick | 241/79 |
| 4,147,017 A * | 4/1979 | Cortopassi et al. | 56/16.5 |
| 4,178,743 A * | 12/1979 | Persoons et al. | 56/12.9 |
| 4,287,707 A * | 9/1981 | Persoons et al. | 56/12.8 |
| 4,340,070 A | 7/1982 | Keitel | |
| 4,589,425 A | 5/1986 | Mitchell, Jr. | |
| 4,627,446 A | 12/1986 | Huhman | |
| 4,642,977 A * | 2/1987 | Ramacher | 56/328.1 |
| 4,662,812 A | 5/1987 | Busboom et al. | |
| 4,846,621 A | 7/1989 | Warsaw | |
| 4,943,260 A * | 7/1990 | Fossum | 460/96 |
| 4,958,756 A | 9/1990 | Conway | |
| 5,103,623 A | 4/1992 | Herrett | |
| 5,176,573 A | 1/1993 | Dow | |
| 5,193,331 A * | 3/1993 | Quandt | 56/12.8 |
| 5,256,106 A | 10/1993 | Shrawder | |
| 5,421,147 A * | 6/1995 | Holden et al. | 56/328.1 |
| 5,528,890 A | 6/1996 | Gray et al. | |
| 5,538,388 A | 7/1996 | Bergkamp et al. | |
| 5,558,576 A | 9/1996 | Meyers | |
| 5,839,954 A | 11/1998 | Schloesser et al. | |
| 5,865,675 A | 2/1999 | Meester | |
| 5,930,987 A * | 8/1999 | Urich et al. | 56/14.5 |
| 5,941,768 A * | 8/1999 | Flamme | 460/114 |
| 5,980,189 A | 11/1999 | Rubner | |
| 6,033,305 A | 3/2000 | Perez et al. | |
| 6,042,326 A | 3/2000 | Thomas et al. | |
| 6,050,073 A | 4/2000 | Nevarez, Sr. | |
| 6,358,141 B1 | 3/2002 | Stukenholtz et al. | |
| 6,547,169 B1 | 4/2003 | Matousek et al. | |
| 6,767,174 B2 | 7/2004 | Cresswell | |
| 6,893,340 B1 | 5/2005 | Schmidt et al. | |
| 7,018,290 B2 | 3/2006 | Ramon et al. | |
| 7,134,830 B2 | 11/2006 | Wood | |
| 7,166,027 B2 | 1/2007 | Messenger | |
| 7,168,554 B2 | 1/2007 | Brandt | |
| 7,413,507 B2 | 8/2008 | Weichholdt | |
| 7,494,409 B2 | 2/2009 | Voss et al. | |
| 7,524,242 B2 * | 4/2009 | Stukenholtz et al. | 460/115 |
| 7,566,266 B1 * | 7/2009 | Ricketts et al. | 460/101 |
| 7,651,391 B1 * | 1/2010 | Weichholdt et al. | 460/111 |
| 7,717,778 B2 | 5/2010 | Redekop et al. | |
| 7,731,578 B2 * | 6/2010 | Birrell et al. | 460/100 |
| 7,811,161 B1 * | 10/2010 | Ricketts et al. | 460/26 |
| 7,837,542 B1 * | 11/2010 | Ricketts et al. | 460/99 |
| 7,862,411 B1 * | 1/2011 | Ricketts et al. | 460/23 |
| 7,867,071 B1 * | 1/2011 | Ricketts et al. | 460/23 |
| 7,927,198 B2 * | 4/2011 | Redekop et al. | 460/99 |
| 7,993,188 B2 * | 8/2011 | Ritter | 460/111 |
| 8,113,353 B2 * | 2/2012 | Redekop et al. | 209/137 |
| 8,286,798 B2 * | 10/2012 | Ricketts et al. | 209/138 |
| 2006/0183519 A1 | 8/2006 | Benes | |
| 2008/0261668 A1 * | 10/2008 | Stukenholtz et al. | 460/44 |
| 2008/0261671 A1 | 10/2008 | Stukenholtz et al. | |
| 2009/0095662 A1 * | 4/2009 | Redekop et al. | 209/509 |
| 2009/0104952 A1 * | 4/2009 | Redekop et al. | 460/80 |
| 2009/0124309 A1 * | 5/2009 | Redekop et al. | 460/100 |
| 2009/0137295 A1 | 5/2009 | Redekop et al. | |
| 2010/0193411 A1 * | 8/2010 | Redekop et al. | 209/509 |
| 2011/0034222 A1 * | 2/2011 | Ricketts et al. | 460/42 |

FOREIGN PATENT DOCUMENTS

| | | |
|---|---|---|
| JP | 5168324 | 7/1993 |
| JP | 6078627 | 3/1994 |
| WO | 91/05460 | 5/1991 |

\* cited by examiner

US 8,961,285 B2

RESIDUE SEPARATING FEED SYSTEM FOR BIOMASS INCLUDING AN IMPELLER

This application claims the benefit of U.S. Provisional Application No. 61/277,758, filed Sep. 29, 2009.

TECHNICAL FIELD

This invention relates generally to a feed system for biomass, particularly adapted for corn cobs, which incorporates a residue separating capability for effectively removing or cleaning less dense biomass residue, e.g., husks, shucks, leaf trash, and the like, from denser biomass, e.g., cobs, as they are fed to a location such as a collection device.

BACKGROUND ART

U.S. Provisional Application No. 61/277,758, filed Sep. 29, 2009, is incorporated herein by reference in its entirety.

With the demand for energy contained in biomass such as corn cobs, demand for equipment to harvest the biomass has increased dramatically. This has thus created a need for modifications to equipment that has existed in the marketplace, as well as for completely new equipment. Some of the challenges that must be overcome include the loading, moving, transporting and refining the harvested biomass. Additionally, in some instances, it may be desired that some of the biomass created in a harvesting operation be returned to the field. This can be for any of a number of reasons, including, but not limited to, to prevent erosion, to break down and return nutrients to the field, and because those aspects of the biomass are insufficiently valuable to justify costs of collection, storage and/or transportation to a user.

Particularly with regard to corn, there is a great deal of biomass material other than the corn kernels that has to be handled. This biomass other than corn kernels is also referred to as material other than grain or MOG. Such biomass can include shucks or husks that wrap about the corn ears, leaf trash from the corn stalks, as well as the stalks themselves. This biomass is typically considered not valuable or desirable. In contrast, the corn cobs are considered valuable, both as animal feed, and as sources of oil and fuel.

As an example, presently, there is an increased demand for corn cobs as a feedstock for cellulosic ethanol, as well as other uses. As a result, there is heightened interest in collecting corn cobs during corn harvest. However, there is also concern by some that cob collection may reduce soil nutrient content. In this regard, crop residue or stover, e.g., corn stalks, leaves, husks and cobs, are traditionally left on the field after harvest, and break down over time to replenish soil nutrients. If a component of the stover, e.g., cobs is instead collected, nutrient levels could be lowered as a result. To mitigate this concern, some consider it desirable when collecting cobs, to collect mostly only cobs, that is, clean cobs with substantially all loose residual husks, leaves and stalks removed, and return the other stover to the field.

Numerous apparatus have been proposed for conveying and cleaning or separating cobs from the other stover or MOG. To illustrate, prior to the early 1960's, the common corn harvesting practice involved picking the ears of corn in the field, removing husks from the ears, and transporting the ears still containing the corn kernels to a corn crib, and later shelling the corn off of the cobs at a stationary sheller. This harvesting procedure has been almost entirely replaced by modern self-propelled combine type harvesters, which separate and collect the corn kernels, and discharge the cobs and other stover onto the field.

Combines which harvest the corn and separate the kernels from the cobs and other stover or residue, then discharge the cobs and other stover onto the field, are now the industry standard. More recently, devices for collecting cobs discharged from combines have been developed. Several of such known devices have variously utilized a towed cart or wagon for receiving and holding the cobs, and a conveyor system for conveying the cobs from the combine to the cart or wagon. Some of the cob collection devices also include apparatus for separating the cobs from the other stover or residue, mainly using air flow.

Essentially, known cob collection devices, sometimes referred to as cob caddies, include apparatus to move or convey the cobs and other residue material to a cleaning area of the device and let it fall. As the material is falling a large fan pulls air up through the material to lift the unwanted MOG or residue away from the cobs. This unwanted material is then sucked into the fan, passes through the fan and is blown out onto the ground. Reference in this regard, Flamme U.S. Pat. No. 5,941,768, issued Aug. 24, 1999, which discloses a cob collection unit pulled behind a combine to collect on a first conveyor all the residue discharged from the combine, with a separation unit behind the conveyor including a second conveyor, and utilizing a fan to suck the stover from the cobs as they are released from the top of the second conveyor and to blow the stover back onto the field. Shortcomings of these systems, however, include high power consumption, and lack of an ability to satisfactorily evenly distribute the cobs and remaining other material in the collection device.

Other known devices and systems use positive pressure air flow for separation and cleaning. Reference in this regard, Redekop et al. U.S. Patent Publication Nos. 20090095662 published Apr. 16, 2009; 20090104952 published Apr. 23, 2009; and 20090124309 published May 14, 2009, which variously disclose a pulled cob collection unit, which utilizes a sequential series of inclined belt conveyors, and blower or suction fans for directing air through the discharged material as it falls from the upper end of one conveyor onto a lower end of the next conveyor, such that the heavier cobs are to continue to the next conveyor and the lighter stover or residue will be carried away by the air flow, with the cobs being conveyed or propelled into a collection tank by a further conveyor or conveyors.

Reference also Stukenholtz U.S. Pat. No. 6,358,141 issued Mar. 19, 2002, and Redekop et al. U.S. Pat. No. 7,717,778, which disclose cob collection systems on a combine which utilize on-board bins and cob separation using sieves on the combine itself.

As a general shortcoming of known conveying and cleaning or separating devices using positive pressure, most essentially require a mat of material moving at a rather high rate of speed, and the air to move through the mat. The high speed of movement makes removal of the unwanted residue difficult. Also, a high rate of speed requires more air, whereas with a lower speed less air is required. These devices can also suffer from the shortcoming of unevenly distributing the cobs and remaining other material in the collection device. In this latter regard, when conveying or propelling the cobs and any remaining residue or MOG into the collection tank or device, the weight and size difference between cobs, which are relatively heavy and large, and the other residue or MOG, which is typically smaller and/or lighter, much of which has a paper like consistency, makes even filling difficult. Essentially, it has been found that the cobs are denser and as a result can be propelled or thrown a greater distance than the less dense residue, e.g., shucks or husks, leaf trash, and fragments. With this in mind, to achieve more even distribution, one must provide a means to throw the material very hard to overcome the lightness of the shucks, husks, etc.

Thus, what is sought is a biomass feed system adapted for feeding desired biomass, e.g., cobs, to a collection device, which also provides a capability for cleaning or removing at least some of the other, lighter or less dense biomass residue from the heavier or denser biomass to be collected, is able to more evenly distribute the biomass in the collection device, and overcomes one or more of the shortcomings set forth above.

SUMMARY OF THE INVENTION

What is disclosed is a biomass feed system adapted for feeding desired biomass, e.g., cobs, to a collection device, which also provides a capability for cleaning or removing at least some of the other, lighter or less dense biomass residue from the denser biomass to be collected, is able to more evenly distribute the biomass in the collection device, and overcomes one or more of the shortcomings set forth above.

According to a preferred aspect of the invention, the feed system uses a conveyor for dropping a flow comprising a mixture of denser or heavier biomass to be collected, e.g., cobs, and less dense or lighter biomass residue, e.g., leaf trash, husks, and fragments thereof, through a space. A rotary feed apparatus is located below for receiving the flow, and is operable for propelling the received flow into a collection device or other destination, most preferably at a higher velocity relative to the speed of the biomass falling into the feed apparatus. A fan is provided in combination with the feed apparatus, e.g., located, or having an air outlet located, intermediate the conveyor and the feed apparatus, configured and operable for directing a flow of air along a second path intersecting the first path, to divert at least a substantial portion of the less dense or lighter biomass residue downwardly away from the feed apparatus, while allowing substantially all of the denser or heavier biomass to continue along the first path to the feed apparatus for feeding into the collection device or other destination.

As an advantage, the downward flow of mixed biomass is preferably propelled only by gravity or mostly gravity so as to move at a relatively slow speed. The speed and/or force of the air flow, as well as the angle at which the air flow intersects the flow of falling biomass, will be selected so as to be sufficient to divert only the lighter or less dense residue portion of the mixture from the feed apparatus, while allowing the heavier or more dense portion, e.g., cobs, to continue along the first path to the feed apparatus.

The lighter or less dense residue, which will comprise mostly leaf trash, husks, fragments, and dust, have been found to be generally of a first density, and will have less mass and thus less velocity and momentum compared to the heavier, denser biomass, e.g., cobs, which have been found to have a second, greater density, such that the lower density items will be capable of diversion by the air flow under the circumstances, whereas the higher density biomass items, e.g., cobs will generally not be diverted. In this regard, it has been observed that there is sufficient difference in the typical densities of matter such as leaf trash, husks and the like, compared to the typical densities of cobs and larger cob fragments, such that the first and second densities can be considered as discrete and distinct from each other and can thus serve as a basis for separating those types or classes of biomass according to the invention.

As another aspect of the invention, it should be understood that numerous factors may determine the air flow parameter or parameters for achieving satisfactory biomass separation. Such factors can include, but are not limited to, air flow volume, velocity, and angle relative to the falling biomass (as represented by the angular relationship between the first path and the second path); biomass mixture composition, density, volume, moisture content, consistency, crop type or variety, as well as environmental and atmospheric conditions.

As a non-limiting representative range of contemplated angles of the second air path relative to the first path, a range of between about 50 and about 80 degrees has been found to be satisfactory for a variety of applications.

In the above regard, it should also be understood that husks still attached to cobs or larger cob fragments, as well as some cob fragments, smaller cobs, and the like, may or may not be diverted, depending on a variety of factors such as those set forth above and others, and therefore there should not be an expectation of a perfect separation of cobs and other residue.

As an additional advantage of the invention, because the biomass mix is allowed to fall under the force of at least substantially just gravity, and a cross or intersecting air flow is used, the biomass is not required to be lifted by the air flow, which reduces energy requirements compared to apparatus that rely on lifting the biomass with air for separation.

As another preferred aspect of the invention, a residue distributor can be disposed at a lower end of the second path, configured and operable for receiving and distributing the diverted biomass residue. The distributor can be powered or passive, as desired or required for a particular application. In the former regard, the distributor can incorporate one or more rotary impellers for spreading the diverted residue. Or, a passive device using one or more deflectors for guiding the residue outwardly, e.g., sidewardly, away from the system, can be used. As one preferred embodiment, the residue distributor can be disposed below the conveyor, and can use the underside or bottom surface thereof to guide the residue flow to the distributor.

According to another preferred aspect of the invention, the feed apparatus uses an impeller which is a beater having slats disposed about an axis of rotation thereof, defining circumferential pockets configured for receiving the biomass. A concave is preferably disposed beneath the beater for receiving the flow of falling biomass, and is configured and operable in cooperation with the beater, which will typically be operated at a high rotational speed, for propelling the biomass to be collected through the inlet opening into the collection device. This provides a powerful means for distributing the biomass evenly within the collection device.

DETAILED DESCRIPTION OF THE INVENTION

Figure 1:
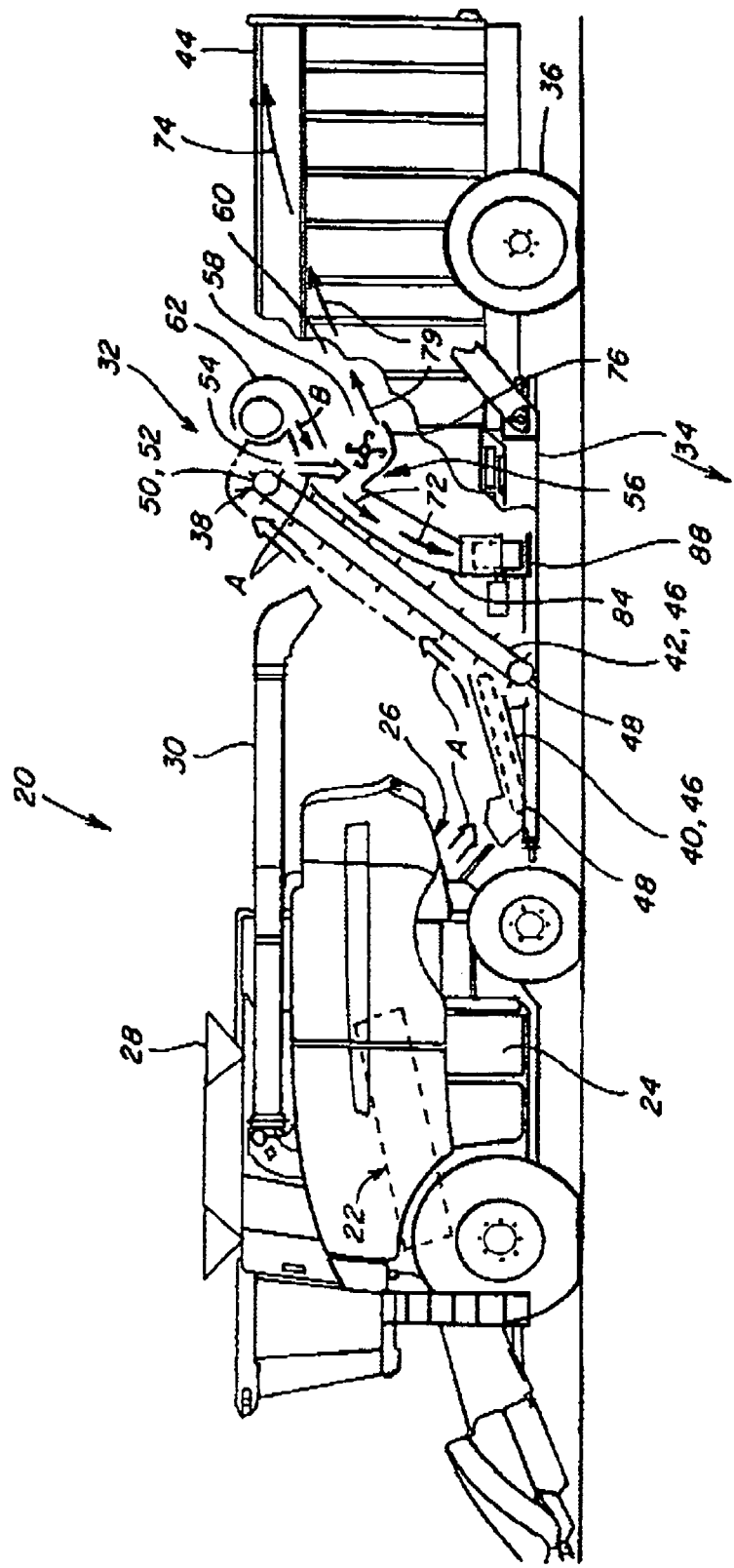
FIG. 1 is a side view of a representative harvester towing a trailer carrying a biomass feed system according to the invention, shown with covers and a side panel removed to reveal internal aspects of the system, and illustrating with arrows operation of aspects of the system.
Figure 2:
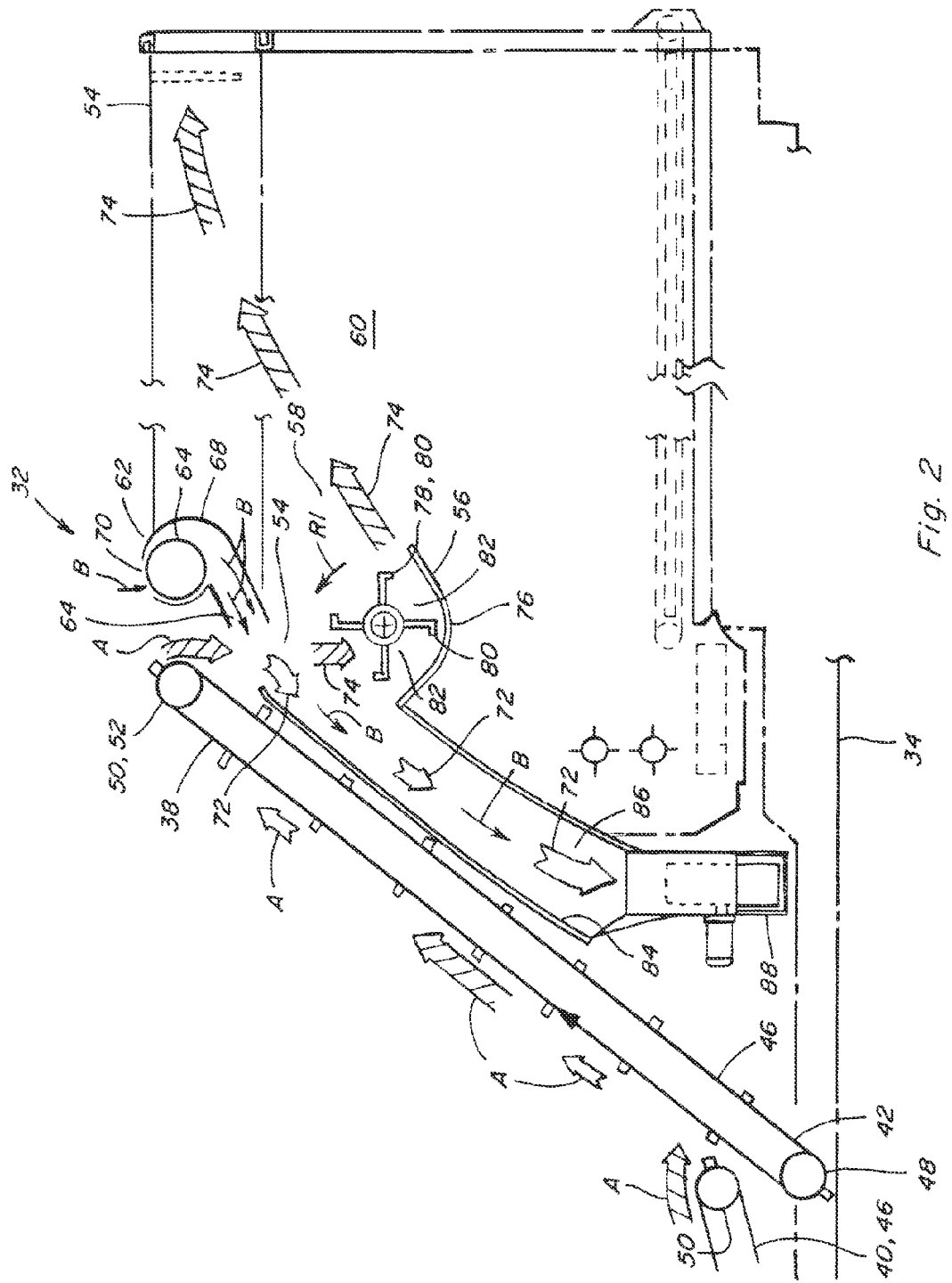
FIG. 2 is an enlarged simplified fragmentary schematic side view of the system, also with a side panel removed, showing aspects of operation of the system with arrows.

Referring now the drawings, in FIGS. 1 and 2, a representative agricultural harvesting machine 20 is shown, which is a combine constructed and operable in the well known manner for harvesting whole ears of corn from corn plants as the combine travels over a field. Combine 20 includes well known apparatus that gathers and conveys the ears of corn into a threshing system 22 within the combine which removes most of the husk surrounding the ears, and the corn kernels from cobs of the ears, and directs a flow of the corn, some of the cobs and fragments thereof, and other residue or stover lighter than the corn and cobs, such as fragments of husks, leaves, dust, and the like, within a rear chamber of machine 20 to a cleaning system 24 of the machine. At the same time, cleaning system 24 has a fan that generates an upward and rearward flow of air, utilized to separate and carry away in an airborne manner the lighter elements of other residue from the kernels, and continue to carry these lighter elements rearwardly through the internal space above system 24 to a rear discharge outlet 26. Any cobs, cob fragments and other heavier elements will also be propelled by movements of the cleaning system, to outlet 26. Also at the same time, larger residue other than corn kernels, such as loose husks, leaves and the like, which are typically of a paper like consistency and are relatively light, dust, and a large amount of cobs and cob fragments, are propelled from threshing system 22 rearwardly within the end of machine 20, and is deflected downwardly toward discharge outlet 26 on the rear end of machine 20, so as to mix with the flow from the cleaning system in the rear confines of machine 20. This mixture is then discharged through outlet 26, as denoted by arrow A.

Cleaning system 24 of combine 20 is operable in the conventional manner to separate the cobs and other larger elements of the corn residue or stover from the smaller kernels of corn and smaller elements of residue, and the corn is collected and conveyed into a clean grain tank 28 on combine 20, or other receiver. The clean corn is then periodically unloaded from tank 28 using an unloader conveyor 30 in the conventional manner, by swinging conveyor 30 to a sidewardly extending position (not shown—conveyor 30 being illustrated in a stowed or travel position here).

For the purposes of the invention, the leaves, husks or shucks, and fragments thereof, are referred to herein as biomass residue, and is desired to be returned to the field from which it was harvested, or otherwise disposed of, whereas the cobs and larger cob fragments are referred to as biomass desired to be collected for some purpose. As noted above, the elements of biomass residue, e.g., leaf trash, husks, fragments, and also dust, have been found to typically fall within a first density range, whereas the cobs and larger cob fragments fall within a second density range greater than the first range. The elements of biomass residue will also tend to have less mass compared to the cobs, and will be of a leafy consistency, whereas the cobs will be more compact, which aids the present invention.

Figure 3:
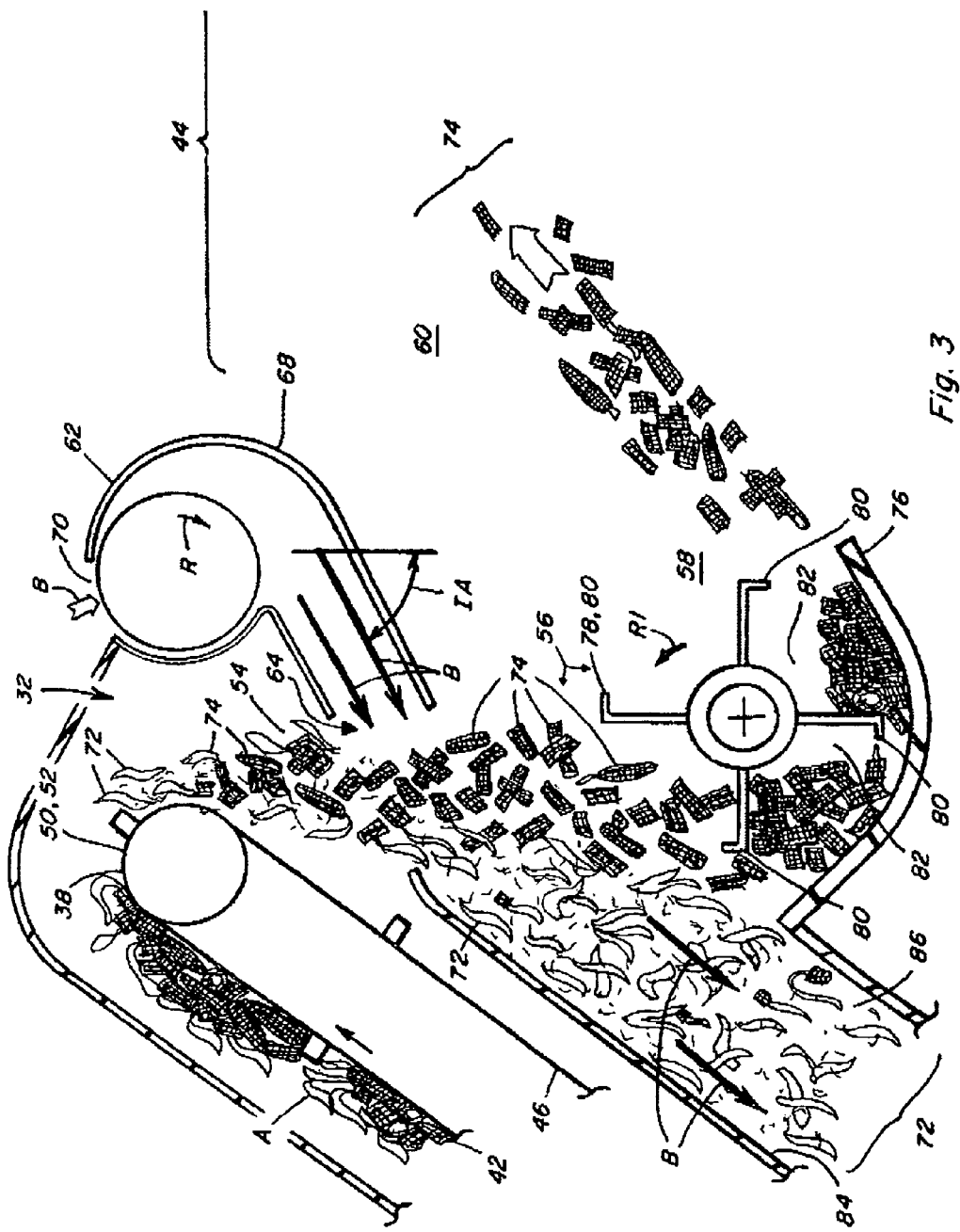
FIG. 3 is a still further enlarged simplified fragmentary side view of the system, again with a side panel removed, showing aspects of operation of the system.

Referring also to FIGS. 2 and 3, machine 20 is shown a including a biomass feed system 32, constructed and operable according to the teachings of the present invention, for receiving the mixed flow A of biomass residue, e.g., husks, leaves, etc., and biomass to be collected, e.g., cobs, separating or cleaning the residue from the cobs, discharging the residue, and feeding the clean cobs into a collection device 44. Here, system 32 is carried on a trailer 34 suitably supported on wheels 36, or tracks (not shown) and configured for towing by machine 20, for carrying aspects of system 32, including a conveyor system 38.

Conveyor system 38 of system 32 here includes a first inclined conveyor 40 and a second inclined conveyor 42, extending to cob collection device 44 also carried on the trailer. Conveyors 40 and 42 can be covered or partially covered, if desired or required for a particular application. Here, it should be understood that the present invention can comprise any number of conveyors, and may or may not include the collection device itself. In this latter regard, as a non-limiting example, it is contemplated that a suitable collection device can alternatively be carried on a separate accompanying vehicle, if desired or required for a particular application. Conveyors 40 and 42 are depicted here as belt type conveyors, each of which includes an endless belt 46 which extends about a roller 48 at the lower end, and which is driven by a drive roller 50 at the upper end, which can be powered by a suitable drive, such as, but not limited to, a fluid or electric motor, belt, chain or the like, for moving the upper surface of the belt rearwardly carrying cobs and any other residue thereon toward collection device 44. To facilitate this, a front end of first conveyor 40 is disposed directly beneath discharge outlet 26 in the path of flow A. Conveyor 40 will then carry flow A and deposit it onto the front end of conveyor 42, which will convey it upwardly and drop it over its elevated rear end 52, into a space 54 therebelow, so as to fall under the force of gravity.

A rotary feed apparatus 56 is located below (at a lower end of space 54) for receiving the flow, and is operable for propelling the received flow through an inlet opening 58 into an interior cavity 60 of collection device 44 at a higher velocity relative to the velocity of the biomass falling into feed apparatus 56 under the force of gravity. A fan 62 is provided in combination with feed apparatus 56, having an air outlet 64 located generally intermediate rear end 52 of conveyor 42 and feed apparatus 56. Fan 62 here is depicted as a centrifugal type, having an elongate impeller housed in an enclosure or wrapper 68, rotatable as denoted by arrow R, for inducting air through an air inlet 70, as denoted by arrow B, and propelling it outwardly through outlet 64 into space 54.

Here, it should be observed that the flow A is falling generally along a vertical path, and air flow B is discharged from outlet 64 along a second path through space 54 at an angle to vertical, but which intersects and passes through flow A. As illustrated in FIG. 3, flow A is comprised of a mixture of elements of biomass residue, e.g., leaves and husks generally of a paper like consistency and of a generally lower density, variously depicted by numbers 72, and elements of biomass to be collected, which here comprises mainly cobs 74 of a higher density. Fan 62 is configured and operable such that air flow B is sufficiently forceful, of adequate volume and in a suitable direction, to penetrate flow A and divert substantially all of elements 72 from their downward path, while allowing substantially all of the cobs 74 to remain on the downward path so as to enter feed apparatus 56, as also illustrated by arrows in FIG. 2. Numerous factors may determine the air flow parameter or parameters for achieving satisfactory biomass separation as illustrated. Such factors can include, but are not limited to, air flow volume, velocity, and angle relative to the falling biomass (as represented by the angular relationship between the first path and the second path); biomass mixture composition, density, volume, moisture content, consistency, crop type or variety, e.g., large cob, small cob, etc., as well as environmental and atmospheric conditions, and thus it is contemplated that adjustments to one or more of the air flow parameters may be required from time to time or as required or desired for a particular application. Here, as a non-limiting representative angle, air flow B is oriented at an intersecting angle IA of about 60 degrees relative to the vertical path of flow A, although a wide range of angles is contemplated, for instance, angles between about 50 and about 80 degrees are contemplated to be acceptable for a variety of applications. The velocity of the falling flow of biomass A will be relatively low, but the velocity of air flow B will be significantly faster than that of flow A, and sufficiently forceful for diverting the less dense biomass from its downward path, but not so as to divert the denser cobs. Velocity of flow B can be controlled by the rotational speed of impeller 64, and also by the size and shape of air outlet 64.

The flow of cobs 74 will fall onto a concave 76 and a rotary impeller 78 of rotary feed apparatus 56, and propelled by impeller 78 into interior cavity 60 of device 44. Impeller 78 is preferably a beater type having slats 80 disposed about an axis of rotation thereof, defining circumferential pockets 82 configured for receiving cobs 74. Concave 76 is disposed beneath impeller 78, which will typically be operated at a high rotational speed, and cooperable therewith to hold the cobs in pockets 82 until propelled by impeller 78 through inlet opening 58 into interior cavity 60 at a high speed sufficient for generally evenly filling the cavity.

Biomass residue 72, once it is clear of rotary feed apparatus 56, can be allowed to fall to the ground below the system, or it can be distributed or spread about on a field below the system. As one manner of distributing residue 72, flow B can be directed against a lower surface 84 of conveyor 42, which is at about the same orientation as the conveyor, and extends downwardly to about the bottom of the conveyor. Surface 84 can be used alone, or, bound a duct 86 which can extend downwardly to the ground, or to a residue distributor or spreader. In FIGS. 1 and 2, as a non-limiting example, a powered spreader 88 is disposed at the bottom of duct 86, configured and operable for spreading the residue 72 sidewardly from trailer 34, in one or both directions. A more complete description of a suitable bi-directional spreader apparatus is disclosed in Schmidt, et al. U.S. Pat. No. 6,983,340, issued May 17, 2005, entitled ROTARY ACCELERATING APPARATUS FOR A VERTICAL STRAW AND CHAFF SPREADER OF AN AGRICULTURAL COMBINE, which patent is hereby incorporated herein by reference in its entirety.

Figure 4:
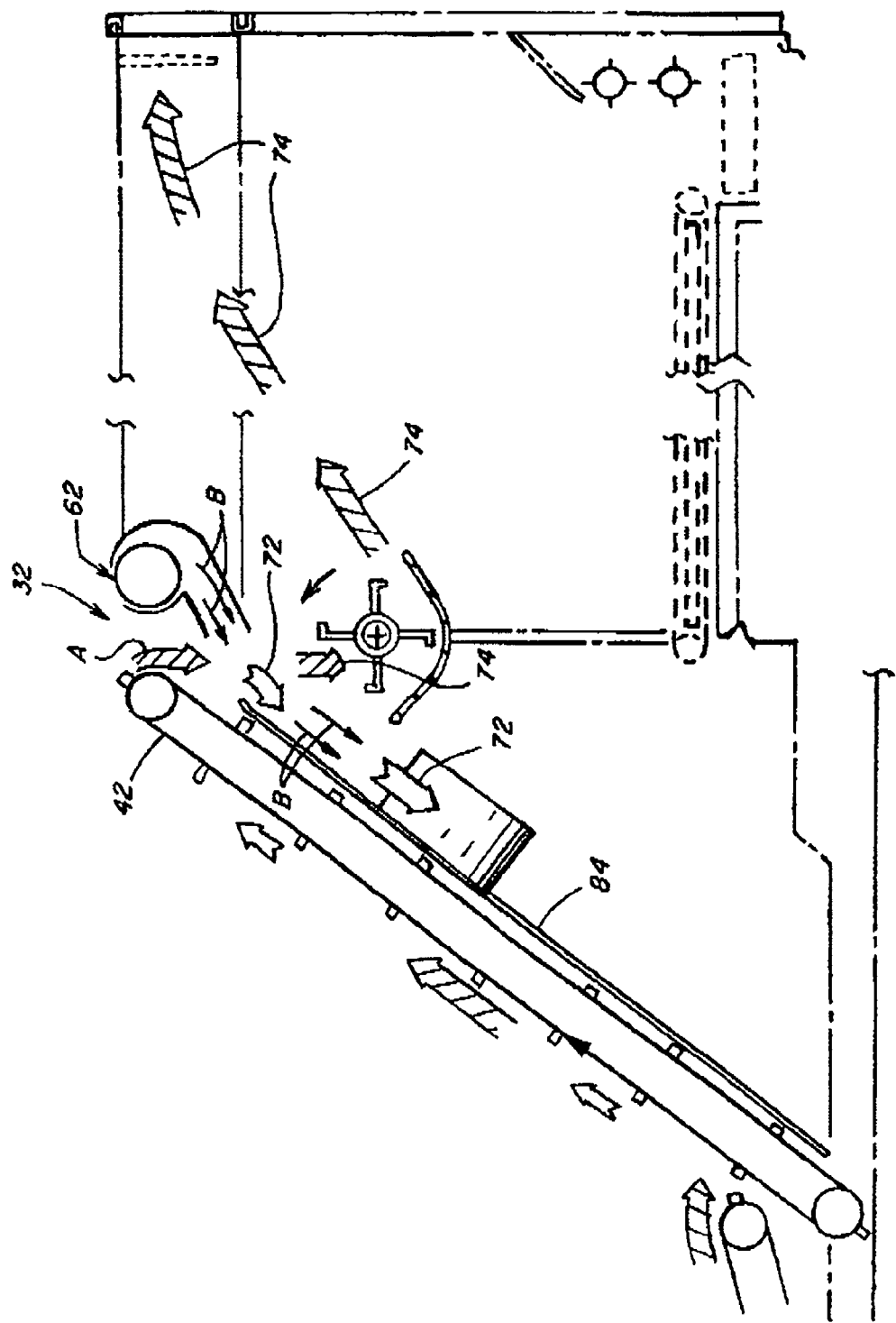
FIG. 4 is a simplified fragmentary schematic side view of the system, showing use of an alternative residue distributor, and operation depicted by arrows.
Figure 5:
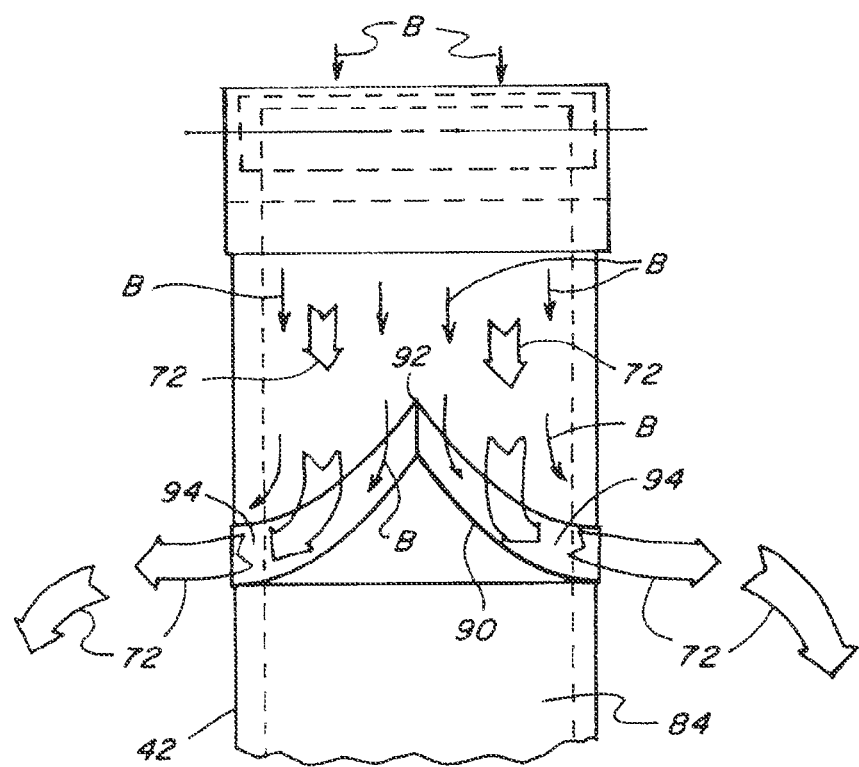
FIG. 5 is a simplified fragmentary rear view of the system of FIG. 4, illustrating operation of the distributor with arrows.

Referring also to FIGS. 4 and 5, an alternative residue distributor 90 is shown supported below lower surface 84 of conveyor 42, in the path of air flow B carrying residue 72. Distributor 90 is located just below and forwardly of feed apparatus 56, such that about any biomass that bypasses that apparatus will encounter distributor 90. Distributor 90 is an unpowered, passive device comprising an upwardly located splitter 92 and a pair of downwardly and sidewardly extending, curved or angled deflectors 94, for splitting and guiding air flow B in two sideward paths away from conveyor 42 and trailer 34 as illustrated.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

What is claimed is:

1. A feed system that separates and diverts a biomass residue having a first density from a biomass to be collected having a second density greater than the first density, comprising:
    a conveyor that carries a mixture of: the biomass residue and the biomass to be collected, along a first path that exposes the mixture to an air flow being generated by a fan, the airflow diverts the biomass residue along a downward path; and
    a beater as part of a rotary feed apparatus, the beater receives the biomass to be collected via a side of a concave after the mixture is exposed to the airflow, wherein the beater rotates to propel the biomass to be collected via an opposing side of the concave in an upward path that is substantially opposite the downward path, and into a space for collection; the concave positioned beneath the beater the beater includes slats disposed about an axis of rotation thereof, defining circumferential pockets configured for receiving the biomass and the rotary feed apparatus further comprises the concave disposed beneath the beater.

2. The system of claim 1, further comprising a residue distributor disposed along the second path, configured and operable for receiving and distributing the diverted biomass sidewardly away from the conveyor.

3. The system of claim 2, wherein the residue distributor comprises at least one rotary impeller rotatable for propelling the diverted biomass residue away from the conveyor.

4. The system of claim 2, wherein the residue distributor comprises a rigid structure having a central splitter and curved or angled guide members extending downwardly and in opposite sideward directions away from the splitter, respectively.

5. The system of claim 2, wherein the residue distributor is disposed below and supported by the conveyor in line with a lower surface of the conveyor such that the lower surface will guide the diverted biomass residue toward the residue distributor.

6. The system of claim 2, wherein the biomass residue having a first density generally comprises corn leaves, husks and fragments thereof, and the biomass to be collected generally comprises corn cobs and fragments thereof.

7. A feed system for a corn cob collection device, operable for separating and diverting biomass residue lighter than cobs from cobs, comprising:
    a conveyor configured and operable for dropping a flow comprising a mixture of the biomass residue lighter than cobs and cobs generally along a first path through a space;
    a collection device having an inlet opening disposed adjacent to the space; and
    rotary feed apparatus disposed in the first path for receiving the flow therealong, the feed apparatus comprising a beater for receiving the biomass to be collected via a side of a concave and propelling the received flow via an opposing side of the concave in an upward path that is substantially opposite the first path the concave positioned beneath the beater, and through the inlet opening into the collection device, upon exposure to a flow of air that is generated by a fan having a discharge outlet disposed above the feed apparatus, configured and operable for generating and directing the flow of air across the first path upstream of the feed apparatus sufficiently for diverting at least a substantial portion of the biomass residue lighter than the cobs away from the feed apparatus, while allowing substantially all of the cobs to continue along the first path to the feed apparatus so as to be propelled;
    the beater having slats disposed about an axis of rotation thereof, defining circumferential pockets configured for receiving the cobs, and the rotary feed apparatus further comprises the concave disposed beneath the beater, configured receiving the flow comprising the biomass and operable in cooperation with the beater for holding the cobs in the pockets until propelled by the impeller from the feed apparatus.

8. The system of claim 7, further comprising a residue distributor disposed in the second path, configured and operable for receiving the flow of air and distributing the diverted biomass residue carried thereby outwardly away from at least one side of the conveyor.

9. The system of claim 8, wherein the residue distributor comprises at least one rotary impeller rotatable for propelling the diverted biomass residue away from the conveyor.

10. The system of claim 8, wherein the residue distributor comprises a rigid structure having a central splitter and curved or angled guide members extending downwardly and in opposite sideward directions away from the splitter, respectively.

11. The system of claim 8, wherein the residue distributor is disposed below the conveyor such that an underside of the conveyor will guide the flow of air and the diverted biomass residue toward the residue distributor.

12. The system of claim 7, wherein the biomass residue has a first density, and the cobs have a second density greater than the first density.

13. The system of claim 12, wherein the biomass residue generally comprises leaves, husks, and fragments thereof.

14. A feed system for a corn cob collection device, operable for separating and diverting biomass residue less dense than cobs from cobs, comprising:
   a conveyor configured and operable for directing a flow comprising a mixture of biomass residue and cobs downwardly along a first path through a space;
   a collection device having an inlet opening disposed adjacent to the space; and
   rotary feed apparatus disposed at a lower end of the first path for receiving the flow from the conveyor, the feed apparatus comprising a beater that rotates to propel the received flow through the inlet opening into the collection device,
   the beater receives biomass to be collected via a side of a concave after the flow is exposed to an airflow by a fan, wherein the beater rotates to propel the biomass to be collected via an opposing side of the concave in an upward path that is substantially opposite the first path, the concave positioned beneath the beater; and
   the fan configured and operable for directing a flow of air through the space along a second path intersecting the first path, such that the flow of air will pass through the first path and divert at least a substantial portion of the biomass residue downwardly along the second path from the feed apparatus, while allowing substantially all of the cobs to continue along the first path to the feed apparatus so as to be propelled thereby into the collection device,
the beater having slats disposed about an axis of rotation thereof, defining circumferential pockets configured for receiving the cobs.

15. The system of claim 14, further comprising a residue distributor disposed at a lower end of the second path, configured and operable for receiving and distributing the diverted biomass residue.

16. The system of claim 15, wherein the residue distributor comprises a rigid structure having a central splitter and curved or angled guide members extending downwardly and in opposite sideward directions away from the splitter, respectively.

17. The system of claim 15, wherein the residue distributor is disposed below and supported by the conveyor such that an underside of the conveyor will guide the diverted biomass residue toward the residue distributor.

18. The system of claim 15, wherein the biomass residue generally comprises leaves, husks, and fragments thereof.

* * * * *